(12) United States Patent
Waigel et al.

(10) Patent No.: US 9,667,006 B2
(45) Date of Patent: May 30, 2017

(54) ELECTRICALLY SYMMETRICAL BATTERY CELL CONNECTOR

(75) Inventors: Hans Waigel, Schnürpflingen (DE); Erik Felser, Erbach (DE); Joachim Rief, Biberach (DE); Tobias Zeller, Neu-Ulm (DE)

(73) Assignee: HUSQVARNA AB, Huskvarna (SE)

( * ) Notice: Subject to any disclaimer, the term of this patent is extended or adjusted under 35 U.S.C. 154(b) by 194 days.

(21) Appl. No.: 14/381,836

(22) PCT Filed: Mar. 5, 2012

(86) PCT No.: PCT/EP2012/053738
§ 371 (c)(1),
(2), (4) Date: Aug. 28, 2014

(87) PCT Pub. No.: WO2013/131551
PCT Pub. Date: Sep. 12, 2013

(65) Prior Publication Data
US 2015/0072210 A1 Mar. 12, 2015

(51) Int. Cl.
*H01M 2/34* (2006.01)
*H01M 2/20* (2006.01)
(Continued)

(52) U.S. Cl.
CPC ............ *H01R 25/16* (2013.01); *H01M 2/204* (2013.01); *H01M 2/206* (2013.01); *H01M 10/04* (2013.01);
(Continued)

(58) Field of Classification Search
CPC ........ H01M 2/20; H01M 2/204; H01M 2/206; H01M 2/22; H01M 2/34
See application file for complete search history.

(56) References Cited

U.S. PATENT DOCUMENTS 4,794,315 A * 12/1988 Pederson ................ F21L 4/085
200/61.58 R
5,993,992 A 11/1999 Field et al.
(Continued)

FOREIGN PATENT DOCUMENTS

CN 101355144 B 7/2010
JP H11162445 A 6/1999

OTHER PUBLICATIONS

International Search Report and Written Opinion of PCT/EP2012/053738 mailed on Dec. 20, 2012, all enclosed pages cited.
(Continued)

*Primary Examiner* — Kenneth Douyette
(74) *Attorney, Agent, or Firm* — Nelson Mullins Riley & Scarborough LLP

(57) ABSTRACT

A battery pack may include a plurality of cells, a cell connector assembly, and a common output. The cell connector assembly may be disposed to contact at least selected ones of the plurality of cells to facilitate parallel connection of contacted cells. The common output may be electrically coupled to the cell connector assembly to receive a combined output from the plurality of cells. The cell connector assembly may include a plurality of metallic arms arranged in a hierarchical structure including at least two levels each having at least one arm, such that the cell connector assembly defines a plurality of current paths from each of the contacted cells to the combined output. The plurality of current paths are substantially equal to each other in length.

13 Claims, 5 Drawing Sheets

(51) Int. Cl.
*H01R 25/16* (2006.01)
*H01M 10/04* (2006.01)
*H01M 10/42* (2006.01)

(52) U.S. Cl.
CPC ............ *H01M 2/34* (2013.01); *H01M 10/425* (2013.01); *H01M 2220/20* (2013.01); *Y10T 29/49108* (2015.01)

(56) References Cited

U.S. PATENT DOCUMENTS

| | | | | |
|---|---|---|---|---|
| 6,097,173 | A * | 8/2000 | Bryant, Jr. ............ | H01M 2/206 320/107 |
| 7,198,866 | B2 | 4/2007 | Miyamoto et al. | |
| 7,771,868 | B2 | 8/2010 | Kim | |
| 7,808,131 | B2 | 10/2010 | Hurst et al. | |
| 7,851,081 | B2 | 12/2010 | Ha et al. | |
| 2004/0053126 | A1 * | 3/2004 | Hirano .................. | H01M 2/202 429/153 |
| 2007/0166574 | A1 | 7/2007 | Nakashima et al. | |
| 2010/0092854 | A1 | 4/2010 | Ha et al. | |

OTHER PUBLICATIONS

Chapter I of the International Preliminary Report on Patentability of PCT/EP/2012/053738 issued on Sep. 9, 2014, all enclosed pages cited.

* cited by examiner

ELECTRICALLY SYMMETRICAL BATTERY CELL CONNECTOR

TECHNICAL FIELD

Example embodiments generally relate to battery pack technology.

BACKGROUND

Property maintenance tasks are commonly performed using various tools and/or machines that are configured for the performance of corresponding specific tasks. Certain tasks, like cutting trees, trimming vegetation, blowing debris and the like, are typically performed by hand-held tools or power equipment. The hand-held power equipment may often be powered by gas or electric motors. Until the advent of battery powered electric tools, gas powered motors were often preferred by operators that desired, or required, a great deal of mobility. Accordingly, many walk-behind or ride-on outdoor power equipment devices, such as lawn mowers, are often powered by gas motors because they are typically required to operate over a relatively large range. However, as battery technology continues to improve, the robustness of battery powered equipment has also improved and such devices have increased in popularity.

The batteries employed in hand-held power equipment may, in some cases, be removable and/or rechargeable assemblies of a plurality of smaller cells that are arranged together in series and/or parallel arrangements in order to achieve desired output characteristics. However, when these cells are arranged together to form battery packs, it is important to consider that different cells may have different characteristics that could impact interactions between the cells. For example, if one cell begins to deteriorate or fail, it may reach full charge before other cells and then be exposed to high temperature and/or pressure stresses while other cells continue to charge. Furthermore, if one cell in a parallel group of cells fails (e.g., short circuits), other cells may begin to discharge at a high rate through the failed cell, which may again cause large thermal and/or pressure stresses that could result in damage to the battery pack.

To avoid damage to battery packs, it may be important to consider employing design features that can either prevent or reduce the likelihood of the early onset of failure for one cell or a group of cells, or otherwise provide safety mechanisms to mitigate or prevent damage when such a failure occurs.

BRIEF SUMMARY OF SOME EXAMPLES

Some example embodiments may provide a battery pack or cell connector for a battery pack that is electrically symmetrical. As such, the resistance of the cell connector as seen from the perspective of any cell, or any group of series connected cells that are connected in parallel via the cell connector, should be substantially the same. Thus, for example, regardless of the physical distance between a load and a particular cell (or group of cells) being connected together using a cell connector of an example embodiment, the cells that are connected via the connector will not be induced to experience different discharge rates due to experiencing different resistance values of the connector. In other words, the connector will be electrically symmetrical, so that the resistance of the cell connector as seen by each cell is a mirror image (or symmetrical) to that seen by each other cell since the resistance from cell to load is the same (or substantially the same) for all cells. The operating life of devices and their batteries, when such a cell connector is employed, may therefore be increased and the overall performance of such a device may be improved.

In one example embodiment, a battery pack is provided. The battery pack may include a plurality of cells, a cell connector assembly, and a common output. The cell connector assembly may be disposed to contact at least selected ones of the plurality of cells to facilitate parallel connection of contacted cells. The common output may be electrically coupled to the cell connector assembly to receive a combined output from the plurality of cells. The cell connector assembly may include a plurality of metallic arms arranged in a hierarchical structure including at least two levels each having at least one arm, such that the cell connector assembly defines a plurality of current paths from each of the contacted cells to the combined output. The plurality of current paths are substantially equal to each other in length.

In another example embodiment, a cell connector assembly for a battery pack is provided. The cell connector assembly may include a plurality of terminal connectors, a plurality of metallic arms, and a common arm. The plurality of terminal connectors may be disposed to connect to corresponding individual ones of a plurality of cells of the battery pack. The plurality of metallic arms may be arranged in a hierarchical structure including at least two levels each of the at least two levels having at least one arm. At least one level of the metallic arms may be disposed such that individual arms of the at least one level contact different individual ones of the plurality of terminal connectors. The common arm may be disposed in electrical communication with at least one arm of the at least two levels. The hierarchical structure of the cell connector assembly defines a plurality of current paths from each of the plurality of terminal connectors to the common arm. The cell connector assembly may facilitate parallel connection of cells connected to the plurality of terminal connectors. The plurality of current paths are substantially equal to each other in length.

In another example embodiment, a method of manufacturing a battery pack where a plurality of cells are to be connected in parallel and each of the plurality of cells is to be connected to a common output via a current path that has a resistance substantially equal to that of current paths connecting other of the plurality of cells is provided. The method may include providing the plurality of cells. The method may further include providing a substantially-rigid cell connector assembly that defines the current path between the common output and each of the plurality of cells, wherein the cell connector assembly comprises a conductor arranged in a tree-like structure configured to electrically couple to the common output at a first end portion and to a terminal of each of the plurality of cells at each of a plurality of second end portions, and wherein the tree-like structure comprises at least a first split in which the conductor branches into two different current paths that are substantially-equal in length. The method may further include positioning the substantially-rigid cell connector assembly proximate the plurality of cells so that each of the plurality of second end portions aligns with a terminal of a cell and fastening each of the plurality of second end portions to the terminal with which it aligns to facilitate parallel connection of the plurality of cells within the battery pack.

Some example embodiments may improve the performance and/or the efficacy of battery powered equipment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
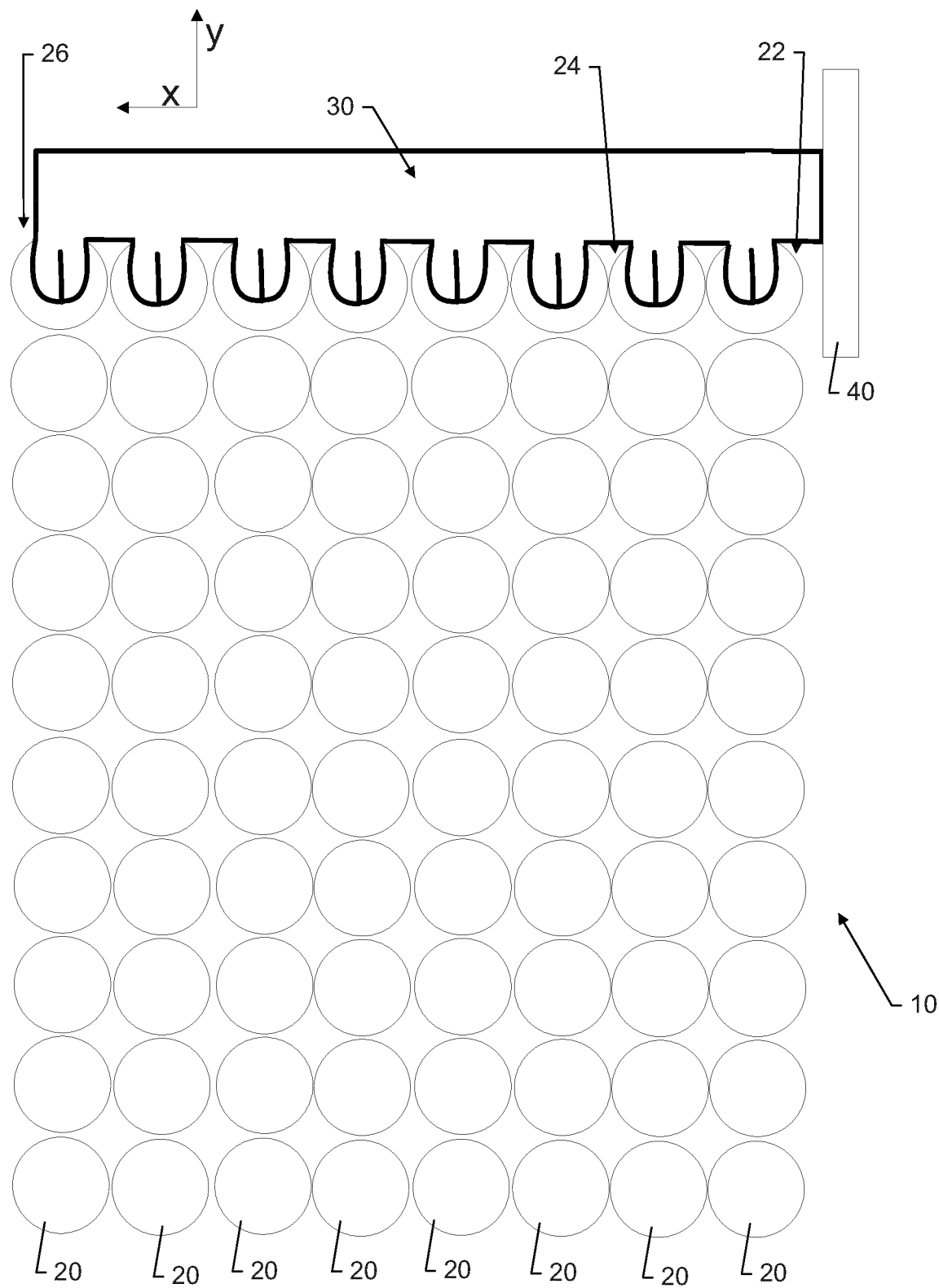
FIG. 1 illustrates a top view of one example of a cell connector assembly that may be employed to connect groups of series connected cells in parallel.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide for a battery pack that can be useful in connection with battery powered tools or battery powered outdoor power equipment. Outdoor power equipment that is battery powered, and battery powered tools, typically include battery packs that include a plurality of individual cells. In order to achieve sufficient power, cells are organized and interconnected (e.g., in a series of series and/or parallel connections) to group the cells in a manner that achieves desired characteristics. FIG. 1 illustrates one example of a top view of a battery pack 10. The battery pack 10 includes a plurality of individual cells 20. Each of the cells 20 may be any suitable type of battery cell. For example, the cells 20 may be nickel-metal hydride (NiMH), nickel-cadmium (NiCd), lithium-ion (LIB), or other similar cells. Thus, in some cases, nominal cell voltages may range from about 1V to about 4V. Series connection of multiple cells may be used to increase the voltage rating of the group of connected cells, and parallel connection of multiple cells may be used to increase the power capacity of the battery pack.

In FIG. 1, groups of ten cells may be series connected in each column of cells 20 along the Y-direction including a first cell group 22, a second cell group 24, and five other cell groups adjacent to each other along the X-direction prior to reaching an eighth cell group 26. The adjacent groups of ten series connected cells may then be parallel connected to each other via cell connector assembly 30. Of note, cell connector assembly 30 may be connected to a positive electrode of each end one of the cells of each of the groups of ten series connected cells. However, to complete the parallel connection of the series connected cells, a second cell connector assembly (not shown) may also be connected to the negative electrode of the cells at the opposite ends of each respective series.

Figure 2:
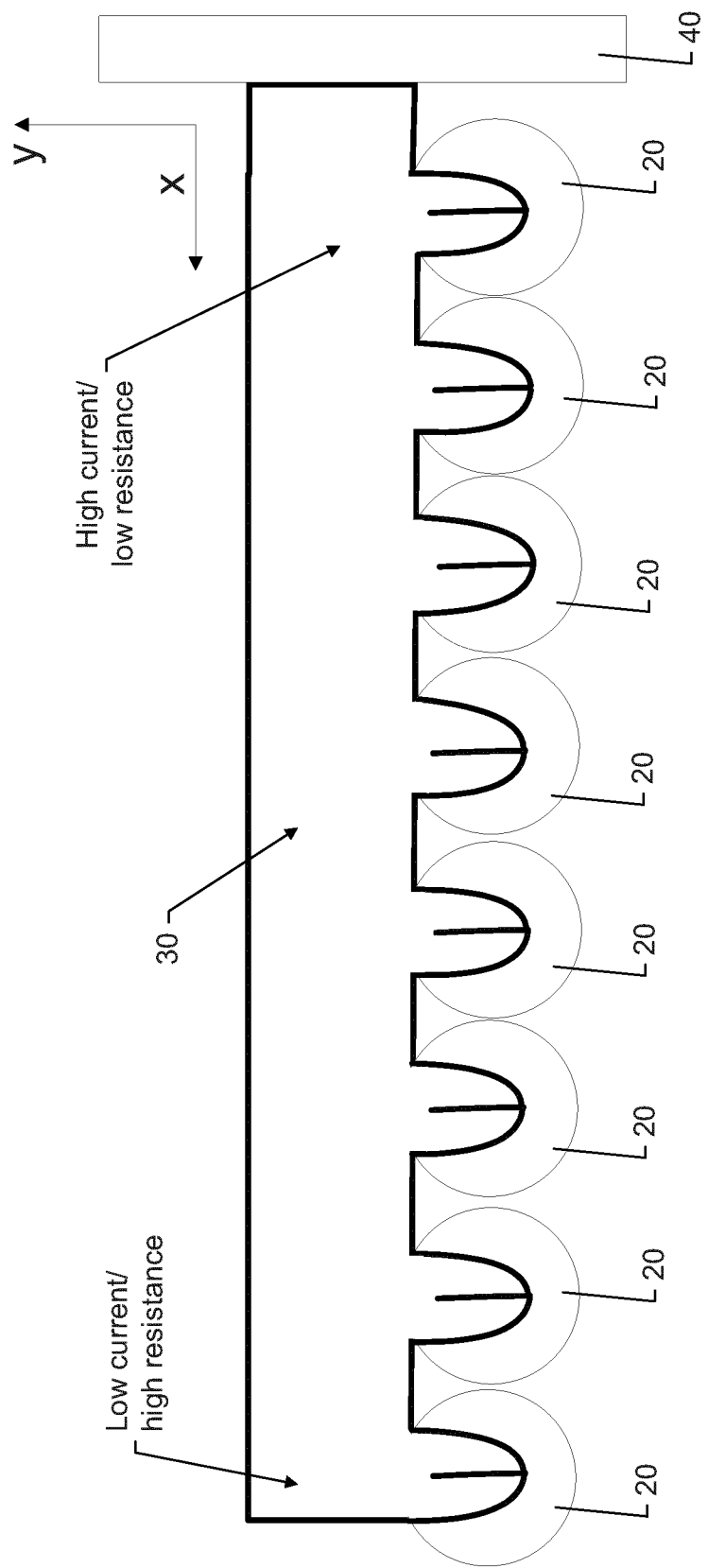
FIG. 2 illustrates a top view of one example of a cell connector assembly that may be employed to connect individual cells in parallel.

In FIG. 1, the cell connector assembly 30 connects groups of series connected cells in parallel. However, in some embodiments, the cell connector assembly 30 could simply connect a plurality of individual cells 20 together in parallel as shown in the example of FIG. 2. In the example of FIG. 2, a cell connector assembly portion would also be provided at the negative terminal of these cells to substantially mirror the cell connector assembly 30. The cell connector assemblies attached to the positive and negative terminals of the battery pack 10 may then be electrically connected to internal or external circuitry to provide power thereto. In some embodiments, several groups of parallel connected cells may be connected in series. Any combination of cell groups having more than one cell per group, and any number of groups could alternatively be employed in various example embodiments. Thus, the fact that FIG. 1 shows eight cell groups with ten cells per group, and that FIG. 2 shows eight cell groups with one cell in each group should not be seen as being limiting, but should instead be appreciated as examples.

In the battery pack 10 of the examples shown in FIGS. 1 and 2, the output of the battery pack 10 may be desirably applied to some load, to some control circuitry or to printed circuit board (PCB) such as PCB 40, which may include terminals for communicating the electrical output of the battery pack 10 to the load and/or control circuitry. The PCB 40 may be positioned along one side, on top of, below, or remotely relative to the cells 20 of the battery pack 10. As an example, in FIGS. 1 and 2, the PCB 40 may be positioned proximate to either one of the cells 20 or to one of the series connected groups of cells 20.

The cell connector assembly 30 may be any cell-connector-tape or other conductor that is suitable to connect each of the corresponding cells 20 together electrically. Thus, for example, the cell connector assembly 30 may be a metallic plate, bar, rod, or other member that may be physically connected to battery terminals (e.g., the positive terminals in this example) of the cells contacted. In some cases, the cell connector assembly 30 (and the opposing assembly on the negative terminals) may be welded (e.g., spot welded) to the corresponding terminals to which it is attached. However, in other alternatives, the cell connector assembly 30 may be clamped, bolted, soldered, or otherwise fastened to the terminals.

The resistivity of the material used to form the cell connector assembly 30 typically determines the amount of resistance to current flow that is presented by the cell connector assembly in relation to the current flowing out of the battery pack 10 and to the load or PCB 40. Resistivity (or conductivity), heat dissipation characteristics, and other factors may be considered when selecting materials for the cell connector assembly 30. Although any of a number of metals considered to have good electrically conductive properties may be selected for the fabrication of the cell connector assembly 30, nickel plated steel and copper (or copper alloys) are examples of some of the commonly used materials that may be employed by some example embodiments.

The resistivity of a material contributes to the electrical resistance that the material provides to current flow when such material is employed in electrical components. Electrical resistance increases as the length of a material increases, and decreases as the cross sectional area of the material increases. Thus, in the examples of FIGS. 1 and 2, since the PCB 40 is shown on the far right of the battery pack 10, the distance that current travels from the first cell group 22 to the PCB 40 is the lowest due to the material having a fixed resistivity value and the distance being relatively low. The distance that current travels from the second cell group 24 to the PCB 40 is higher than the distance current travels from the first cell group 22. Thus, the same value of resistivity is encountered over a longer length, thereby making the resistance value of the cell connector assembly 30 as seen by the second cell group 24 higher than the resistance value of the cell connector assembly 30 as seen by the first cell group 22. The distance increases further for each of the subsequent five cell groups until the eighth cell group 26 is reached. Current has the longest distance to travel from the eighth cell group 26. Thus, in a situation where, as is shown in FIGS. 1 and 2, the cross sectional area of the cell connector assembly 30 does not change appreciably along its length, the resistance to current flow that is presented by the connector assembly 30 is greatest for the eighth cell group 26 and is least for the first cell group 22.

In a situation where the cells 20 are substantially equivalent (at least initially) in their cell voltages, each of the cell groups provides about the same voltage. However, since each cell group experiences different levels of resistance while supplying the load (or PCB 40), different currents are generated in each cell group and therefore different stresses are experienced in each cell group. Moreover, current is not balanced among the cell groups so that it may become more likely that one cell, or a group of cells, may become overloaded, or that deep-discharging of a single cell may occur. Unbalanced currents could lead to the development of conditions that may damage the battery pack 10 or even damage components to which the battery pack 10 is connected.

Figure 3:
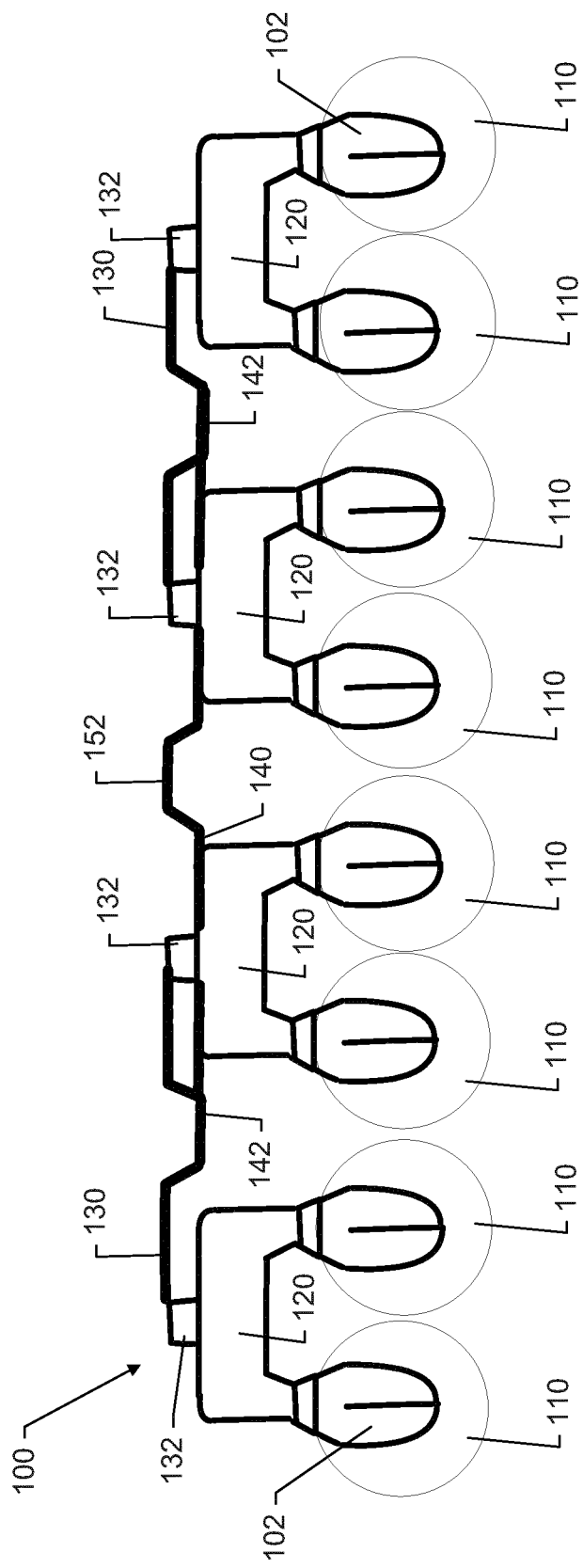
FIG. 3 illustrates a top view of a cell connector assembly that provides electrical symmetry while connecting groups of cells or individual cells in parallel according to an example embodiment.
Figure 4:
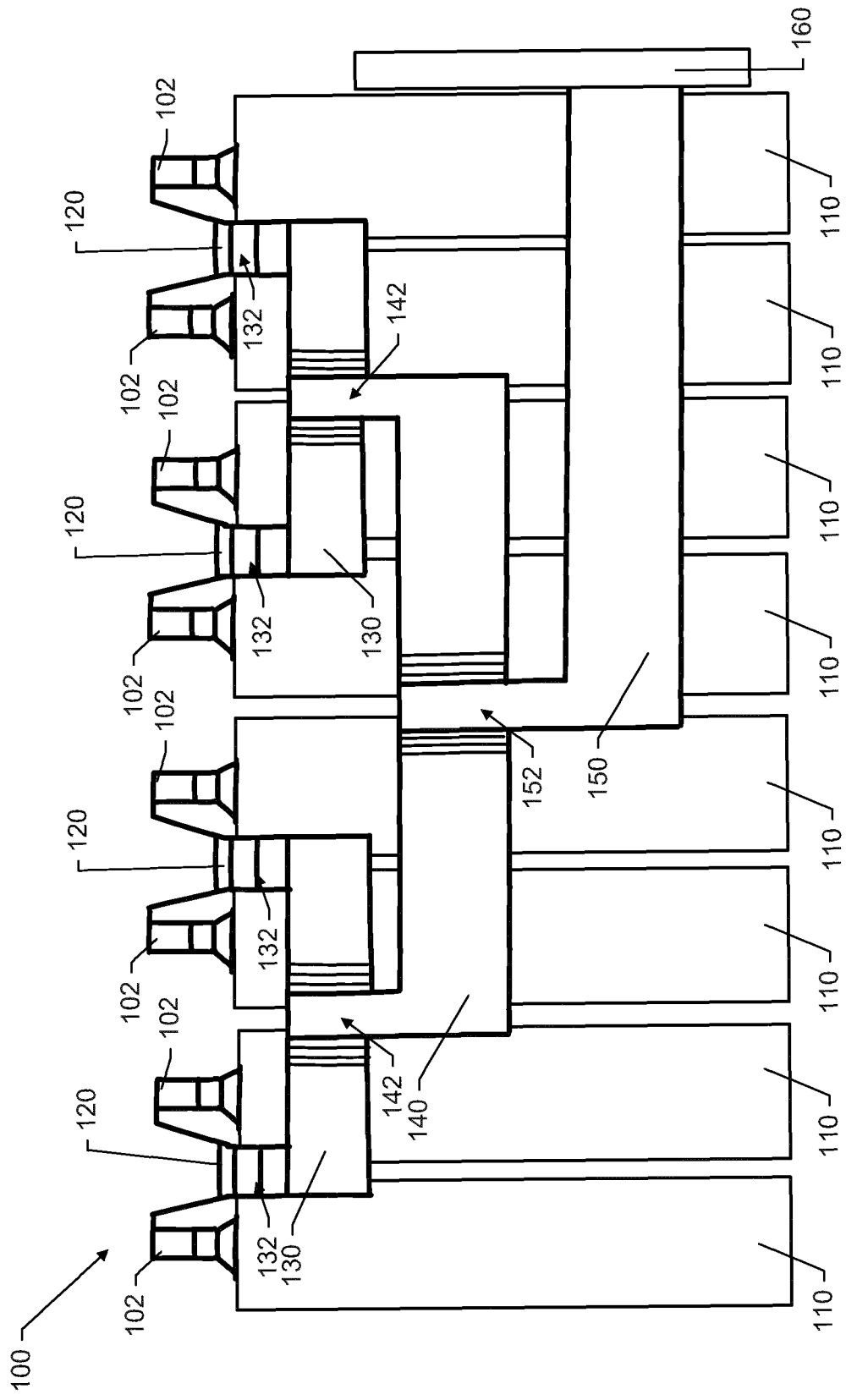
FIG. 4 illustrates a side view of the cell connector assembly of FIG. 3 according to an example embodiment.

To address the issues (e.g., unbalanced currents) that may arise from the examples shown in FIGS. 1 and 2, some example embodiments may provide an electrically symmetrical cell connector assembly such as that which is shown in the example embodiments of FIGS. 3 and 4. In this regard, FIG. 3 illustrates a top view of a cell connector assembly 100 of an example embodiment and FIG. 4 illustrates a side view of the cell connector assembly 100 of FIG. 3. The cell connector assembly 100 of FIGS. 3 and 4 provides electrical symmetry, for example, by providing a tree-like structure including a plurality of arms assembled to provide an equivalent effective length of the material used to electrically couple each cell (or group of cells) connected in parallel by the cell connector assembly 100 to a common output. Since the effective length of the material used to couple each cell is the same, given a relatively constant resistivity of the material, the resistance value of the cell connector assembly 100 as seen by each cell 110 may be substantially equal. In an example embodiment, a plurality of terminal connectors 102 may be disposed to connect to corresponding individual ones of the cells 110 of the battery pack to each other via the cell connector assembly 100. Each of the terminal connectors 102 may be welded, clamped, bolted, soldered or otherwise fastened to the terminals of each respective one of the cells 110.

In an example embodiment, any number of cells (or groups of cells) could be included in a battery pack to which the cell connector assembly 100 is connected. As indicated above, another cell connector assembly may also connect to the negative terminals of the cells. For any cell connector assembly produced according to an example embodiment, the cell connector assembly may be configured such that the length of material of the cell connector assembly that is encountered by current supplied from a cell to be delivered to a load (or PCB) may be substantially equal.

In example embodiments where n number of cells (or groups of cells) are connected by the cell connector assembly 100, and n is equal to the number 2 raised to a power m (e.g., $n=2^m$), then a way to achieve symmetry may include dividing the n number of cells into pairs. The pairs may then further be divided into pairs until only one pair results. In doing so, there may be m different levels defined in the tree-like structure and connecting pairs at each respective level may include arms (or members) of equal length as is shown in FIGS. 3 and 4. In this regard, for example, the eight cells 110 (or n=8, which is $2^3$ such that m=3) of FIGS. 3 and 4 may be divided into four pairs of cells in which each pair of cells is connected to each other by a corresponding first level arm 120. The four first level arms 120 of FIGS. 3 and 4 (e.g., one for each pair of cells) are each of substantially the same length as the other first level arms 120 and either have identical width, height, and material content or identical variations in width, height, and material content as the other first level arms 120. Thus, four pairs of cells each include a corresponding first level arm 120 interconnecting the cells of the respective pairs of cells. The first level arms 120 are then paired and the pairs (which may include adjacent cell pairs) may be interconnected via second level arms 130 that all have the same length as the other second level arms 130 and either have identical width, height, and material content or identical variations in width, height, and material content as the other second level arms 130. Notably, although the first level arms 120 may all have the same length, and the second level arms 130 may all have the same lengths, the length of the first level arms 120 need not necessarily be the same as the length of the second level arms 130. In an example embodiment, a distance from each cell 110 to a tapping point 132 for the second level arms 130 off of the first level arms 120 may be substantially equal. In this regard, the second level arms 130 may connect to the first level arms 120 at a point on the first level arms 120 that is half way between the cells 110 connected by the first level arms 120.

In the example of FIGS. 3 and 4, there are two second level arms 130. The two second level arms 130 may then be interconnected via a third level arm 140. The third level arm 140 may connect to each of the second level arms 130 at a tapping point 142 that is substantially half way along the length of the second level arms 130 (e.g., half way between the tapping points 132 at the respective ends of the second level arms 130). A common arm 150 may then connect to the third level arm 140 at a tapping point 152 that is substantially half way along the length of the third level arm 140 (e.g., half way between the tapping points 142 at the respective ends of the third level arms 140).

Accordingly, n number of cells where $n=2^m$, can be interconnected via m number of levels of arms (not counting the common arm), where arms at each level are of the same length as other arms in the same level and a first level of arms connects pairs of cells while every subsequent level of arms connects a pair of higher level arms together by connection at a tapping point that is substantially half way along the length of the higher level arms. A common arm 150 (or common output) may then tap into the last level arm at a point half way along the length of the last level arm to combine currents from all other levels into a combined output. Said another way, the cell connector assembly 100 is formed into a tree-like structure that includes m number of splits along its length, each split creating two branches of equal length.

This structure makes the length of material encountered between each cell 110 (or group of cells) and a load (e.g., PCB 160) the same without regard to the physical distance between the cell 110 and the PCB 160. Accordingly, the resistances along the paths between each cell 110 (or group of cells) and the load (e.g., PCB 160) are identical assuming identical variations of cross section and material along the paths. To illustrate this point, note that the entirety of the length of the cell connector assembly 100 from the perspective of the farthest distant cell (relative to the PCB 160) is the sum of component parts including distance A (from the farthest distant cell to its tapping point 132 to its second level arm 130), distance B (from its tapping point 132 to the second level arm 130 to its tapping point 142 to its third level arm 140), distance C (from its tapping point 142 to the tapping point 152 to the common arm 150), and distance D (the length of the common arm 150). Meanwhile, the entirety of the length of the cell connector assembly 100 from the perspective of the closest cell (relative to the PCB 160) is the sum of component parts including distance A' (from the closest cell to its tapping point 132 to its second level arm 130), distance B' (from its tapping point 132 to the second level arm 130 to its tapping point 142 to its third level arm 140), distance C' (from its tapping point 142 to the tapping point 152 to the common arm 150), and distance D (the length of the common arm 150). The sum of A, B, C and D is equal to the sum of A', B', C' and D since A=A', B=B' and C=C'. Thus, from the perspective of each and every cell, the length of the cell connector assembly 100 as current travels from the cells to the PCB 160 is the same by virtue of the fact that a length of each component portion of the arms of the tree-like structure used to interconnect the cells is the same.

In the example of FIGS. 3 and 4, the first level arms 120 are disposed over a top portion of the cells 110, while remaining portions of the cell connector assembly 100 are disposed proximate to a side of the cells 110. Thus, for example, one or more of the levels of arms may be disposed such that a substantial portion of the corresponding arms are disposed parallel to a first plane, and one or more other levels of arms of the cell connector assembly may be disposed parallel to a second plane that is substantially perpendicular to the first plane. However, all arms could lie in a same plane in other example embodiments. Moreover, a longitudinal length of each of the arms (or a substantial portion thereof) shown in FIGS. 3 and 4 lies substantially parallel to each other.

Although it is not necessary, in some embodiments, a width and/or thickness of each subsequent level of arms may be increased, as illustrated in the example embodiment of FIGS. 3 and 4. In other words, a cross sectional area of at least one level of arms may be different than a cross sectional area of an adjacent level of arms. Increasing the width and/or thickness of each level of arms may cause a corresponding decrease in resistivity. Given that the currents flowing through each arm of the same level are substantially equal, but currents at subsequent levels are added, the current through each subsequent level is higher. By decreasing the resistivity, it may be possible to produce less heat in subsequent levels of arms even though larger currents pass therethrough. Thus, for example, the first level arms 120 may be thinner and/or narrower than the second level arms 130, the second level arms 130 may be thinner and/or narrower than the third level arms 140, and/or the third level arms 140 may be thinner and/or narrower than the common arm 150. However, such a structure is not required, and may not be desired in some situations.

It should be noted that the example of FIGS. 3 and 4 provides a relatively elegant structure for a cell connector assembly 100 that effectively has identifiable paths of conduction to the load (e.g., PCB 160) from the perspective of each cell (or cell group) that is connected thereby. In this regard, the common arm 150 connects to an arm that connects two lower level arms, and each of the two lower level arms connects to two lowest level arms that connect a pair of cells, where the locations for tapping into each arm to connect it to a subsequently higher level arm is at a halfway point along a length of the arm. Thus, precise distance calculations need not necessarily be performed to determine where to tap and how long to make each respective arm. However, example embodiments could also be practiced with other numbers of cells (or groups of cells) that do not evenly divide into pairs of cells at all subsequent levels after the level that interfaces with the common arm. Calculations could be performed in such example embodiments to provide tap points in locations that ultimately make the cell connector assembly have the same length from the perspective of each cell (or cell group).

In an example embodiment, each of the arms of the cell connector assembly 100 may be a portion of a single, unitary assembly. Moreover, the arms (either of the same level or of different levels) may be formed substantially simultaneously in a single stamping process or molding process. However, in other example embodiments, the arms may be formed separately by any suitable method, and the arms may thereafter be joined together to form the cell connector assembly 100. In some embodiments, the arms may be welded, bolted, clamped or affixed via any suitable method. Resistance welding, laser welding, or any of a number of other welding techniques may be employed to form the cell connector assembly 100.

Figure 5:
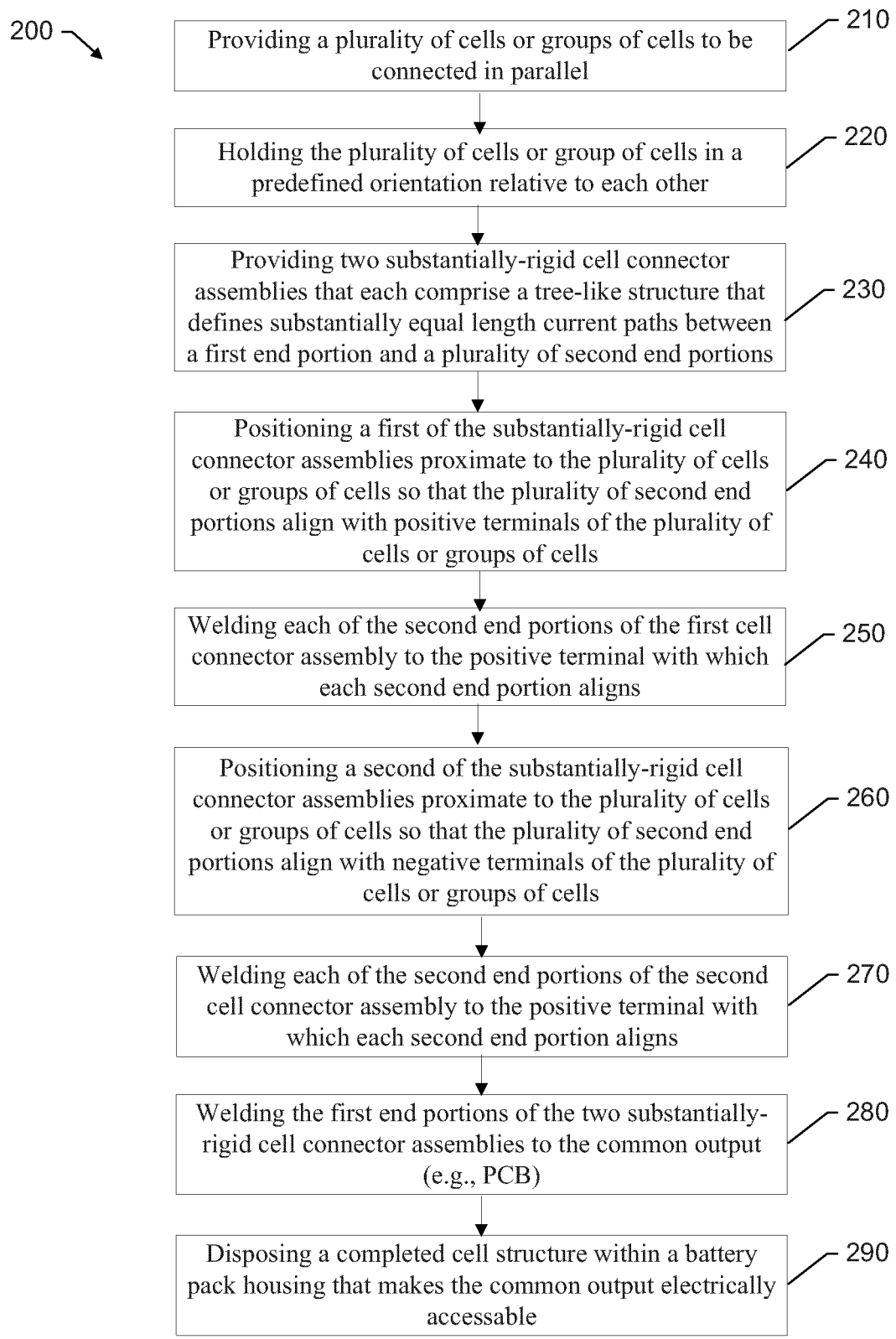
FIG. 5 illustrates a block diagram of a method of providing a battery pack according to an example embodiment.

FIG. 5 illustrates a method 200 of making a battery pack in accordance with an example embodiment. It should be appreciated that some embodiments of the invention may make manufacturing a battery pack easier when several cells or groups of cells need to be connected in parallel by current paths having substantially equal resistance. In this regard, a method of manufacturing a battery pack may include providing a plurality of cells or groups of cells to be connected in parallel at operation 210. As described above, in some embodiments of the invention, the battery pack includes a plurality of individual cells connected in parallel using the cell connector assembly. In other embodiments, the battery pack includes a plurality of groups of cells connected in parallel using the cell connector assembly, where each group of cell includes a plurality of cells connected in series. In such embodiments, the operation 210 of providing a plurality of groups of cells may include an operation of connecting a plurality of cells in each group in series. This operation may involve, for example, lining up the cells in a line and using individual connectors (e.g., pieces of metallic tape) to connect the negative terminal of one cell to the positive terminal of the adjacent cell down the line. In one embodiment with the positive and negative terminals are on opposing ends of each cell, the cells in each line may be oriented with opposite polarities so that the positive terminal of one cell is next to the negative terminal of the adjacent cell. In some embodiments, robotic arms position the cell connectors so that they bridge the positive and negative terminals of adjacent cells and then spot weld the connectors to the terminals.

The method 200 may further include holding the plurality of cells or groups of cells in a predefined orientation relative to each other in operation 220. For example, in one embodiment, spacers are used to hold each cell an appropriate distance from adjacent cells and align the cells in rows and/or columns so that the positive and negative terminals are aligned for a series or parallel connection as the case may be. In some embodiments where groups of series connected cells are connected in parallel, the cells may be placed in spacers prior to being connected in series. For example, in one embodiment, to prepare the cells for the parallel connection the cells or groups of cells may be positioned so that all of the positive terminals of each cell or group are aligned in a straight line and all of the negative terminals of each cell or group are aligned in a straight line.

The method 200 may further include an operation 230 of providing two substantially-rigid cell connector assemblies (such as those described above) that each comprise a tree-like structure that defines substantially equal length current paths between a first end portion and a plurality of second end portions. This operation may include manufacturing the cell connector assemblies by, for example, stamping the hierarchical tree-like structure from a metallic sheet and/or welding individual metallic conductors together to form the hierarchical tree-like structure. As recited in FIG. 5, the cell connector assemblies may be manufactured so as to be substantially-rigid at least to the point where they do not significantly lose their shape when picked up at a single point. In some embodiments the two cell connector assemblies provided in this operation may be similar in structure but not identical since one will connect the positive terminals of the cells or groups of cells and the other will connect the negative terminals of the cells or groups of cells. For example, depending on the relative positioning of the cells and the common output, the two cell connector assemblies may be mirror images of each other.

The method 200 may further include, in operation 240, positioning a first of the substantially-rigid cell connector assemblies proximate the plurality of cells or groups of cells so that the plurality of second end portions align with positive terminals of the plurality of cells or groups of cells. In some embodiments, this operation is performed robotically by selecting one cell connector assembly from a first group of cell connector assemblies and holding it against the cells so that the second end portions of the cell connector assembly aligns with the positive terminals to be connected in parallel. Here, embodiments of the invention where the cell connector assembly is substantially-rigid may be advantageous since the cell connector assembly will not significantly deform when picked-up and held by a robotic arm at, perhaps, a single contact point. Furthermore, if the cells are properly positioned in operation 220, then all of the second end portions of the cell connector assembly should naturally align with the terminals when at least two second end portions are aligned with the appropriate two terminals or when the any two points on the cell connector assembly are otherwise positioned appropriately in space relative to the plurality of cells.

The method 200 may then include, in operation 250, welding (or fastening in another way) each of the second end portions of the first cell connector assembly to the positive terminal with which each second end portion aligns. In some embodiments, the welding is completed robotically via a robotic spot welder that, now that the cell connector assembly is held so that all of the second end portions are aligned with the appropriate terminals, can quickly spot weld all of the connections by moving to the appropriate points in space and welding the connector to the terminal down the line of the second end portions.

Operations 260 and 270 are similar to operations 240 and 250, but are completed for the negative terminals to be connected in parallel. As such, the cell connector assembly may be taken from a different group since, in some embodiments, the cell connector assembly for the negative terminals may be a mirror image or otherwise slightly different than the cell connector assembly used for the positive terminals, while still having the same general tree-like current path structure.

The method 20 may also include operation 280 where the first end portions of the two substantially-rigid cell connector assemblies are each welded or otherwise fastened to the common output, which may be a PCB. As illustrated by operation 290, the completed cell structure may then be disposed within a battery pack housing, where the hosing makes the common output electrically assessable. For example, a positive and a negative terminal may extend from the PCB through openings in the housing wall.

It will be appreciated that method 200 illustrates an example method of making a battery pack according to an embodiment of the invention. It should also be appreciated that other methods may also be used and that some steps in the method may be completed in a different order or simultaneously. For example, operations 260 and 270 could be performed before or simultaneously with operations 240 and 250.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery pack comprising:
   a plurality of cells;
   a cell connector assembly disposed to contact at least selected ones of the plurality of cells to facilitate parallel connection of contacted cells; and
   a common output electrically coupled to the cell connector assembly to receive a combined output from the plurality of cells,
   wherein the cell connector assembly comprises a plurality of metallic arms arranged in a hierarchical structure including at least two levels each having at least one arm, such that the cell connector assembly defines a plurality of current paths from each of the contacted cells to the common output, and
   wherein the plurality of current paths are substantially equal to each other in length, such that each of the current paths provides equal resistance for each of the plurality of cells, and
   wherein each arm of a first level has the same width, height, and material content as other arms of the first level and each arm of the second level has the same width, height, and material content as other arms of the second level, such that cell connector assembly is electrically symmetrical.

2. The battery pack of claim 1, wherein the cell connector assembly is formed as a single, unitary piece.

3. The battery pack of claim 1, wherein the cell connector assembly is formed of a plurality of separate components joined together.

4. The battery pack of claim 3, wherein the separate components are joined together by welding, soldering, or screwing.

5. The battery pack of claim 1, wherein the battery pack comprises n number of cells where $n=2^m$, m defining a number of levels of arms of the cell connector assembly, where arms at each level are of a same length as other arms in the same level and a first level of arms connects pairs of cells while every subsequent level of arms connects a pair of arms of a previous level.

6. The battery pack of claim 5, wherein arms at each level connect to an adjacent level via a tapping point that is disposed substantially half way along a length of arms of the adjacent level.

7. The battery pack of claim 1, wherein the cell connector assembly comprises a plurality of arms, at least some of which are disposed in different levels, one or more levels of arms being disposed such that a substantial portion of arms of at least one level are disposed parallel to a first plane, and one or more other levels of arms of the cell connector assembly are disposed parallel to a second plane that is substantially perpendicular to the first plane.

8. The battery pack of claim 7, wherein a substantial portion of a longitudinal length of each of the arms lies substantially parallel to each other.

9. The battery pack of claim 1, wherein a cross sectional area of the first level of arms is the same as a cross sectional area of the second level of arms.

10. The battery pack of claim 1, wherein the cell connector assembly comprises identical variations in cross sectional area along each of the plurality of current paths.

11. The battery pack of claim 1, wherein the plurality of cells comprises cells connected in series to each of the contacted cells.

12. The battery pack of claim 1, further comprising:
    a second cell connector assembly substantially similar to the cell connector assembly,
    wherein the cell connector assembly connects the positive terminals of the contacted cells together, and
    wherein the second cell connector connects the negative terminals of the contacted cells together.

13. The battery pack of claim 1, wherein a cross sectional area of the first level of arms is the different than a cross sectional area of the second level of arms.

* * * * *

UNITED STATES PATENT AND TRADEMARK OFFICE
CERTIFICATE OF CORRECTION

PATENT NO. : 9,667,006 B2  
APPLICATION NO. : 14/381836  
DATED : May 30, 2017  
INVENTOR(S) : Hans Waigel et al.

Page 1 of 1

It is certified that error appears in the above-identified patent and that said Letters Patent is hereby corrected as shown below:

In the Claims

Column 12, Claim 13, Line 2:
"area of the first level of arms is the different" should read --area of the first level of arms is different--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*